United States Patent
Azegami et al.

(10) Patent No.: US 9,517,514 B2
(45) Date of Patent: Dec. 13, 2016

(54) EXCHANGEABLE HEAD CUTTING TOOL

(75) Inventors: Takayuki Azegami, Akashi (JP); Taro Abe, Akashi (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 59 days.

(21) Appl. No.: 14/237,799

(22) PCT Filed: Aug. 30, 2012

(86) PCT No.: PCT/JP2012/071973
§ 371 (c)(1),
(2), (4) Date: Feb. 7, 2014

(87) PCT Pub. No.: WO2013/035619
PCT Pub. Date: Mar. 14, 2013

(65) Prior Publication Data
US 2014/0205389 A1 Jul. 24, 2014

(30) Foreign Application Priority Data
Sep. 9, 2011 (JP) ................................. 2011-197074

(51) Int. Cl.
*B23C 5/26* (2006.01)
*B23C 5/00* (2006.01)
(Continued)

(52) U.S. Cl.
CPC ............. *B23C 5/006* (2013.01); *B23B 51/00* (2013.01); *B23C 5/10* (2013.01); *B23C 5/22* (2013.01);
(Continued)

(58) Field of Classification Search
CPC ............ B23C 2210/03; B23C 2210/02; B23C 2240/24; B23C 2240/245; B23C 5/26
See application file for complete search history.

(56) References Cited

U.S. PATENT DOCUMENTS 2,656,190 A * 10/1953 Towle ................. B24B 45/006
279/2.03
3,526,025 A * 9/1970 Sletten ................ B23B 27/1651
407/104

(Continued)

FOREIGN PATENT DOCUMENTS

| JP | 07-164234 A | 6/1995 |
| JP | 2002-538012 A | 11/2002 |
| JP | 2003-251540 A | 9/2003 |
| JP | 2011-143532 A | 7/2011 |
| JP | 2012-071391 A | 4/2012 |
| WO | WO-2009/084081 A | 7/2009 |

OTHER PUBLICATIONS

International Search Report mailed Sep. 25, 2012 for the corresponding PCT Application No. PCT/JP2012/071973.

*Primary Examiner* — Daniel Howell
*Assistant Examiner* — Yasir Diab
(74) *Attorney, Agent, or Firm* — Leason Ellis LLP (57) ABSTRACT

An exchangeable head cutting tool contains a tool main body made of a hard material and a connecting member made of a metal material having a lower hardness than the hard material. The tool main body and the connecting member are joined by inserting a cylindrical mounting portion of the connecting member into a mounting hole formed in the tool main body, and by plastically deforming the mounting portion so as to expand a diameter thereof, thereby bringing an outer peripheral surface of the mounting portion into close contact with the inner peripheral surface of the mounting hole and thus making the outer peripheral surface of the mounting portion engage with a concave portions of the tool main body. A diameter expanding member having a higher hardness than the connecting member is press-fitted into and fixed to an inner peripheral portion of the mounting portion.

11 Claims, 9 Drawing Sheets

(51) Int. Cl.
*B23C 5/10* (2006.01)
*B23B 51/00* (2006.01)
*B23C 5/22* (2006.01)
*B23D 77/02* (2006.01)
*B23P 15/28* (2006.01)
*B23P 11/00* (2006.01)

(52) U.S. Cl.
CPC ............. *B23D 77/02* (2013.01); *B23P 15/28* (2013.01); *B23C 5/26* (2013.01); *B23C 2210/02* (2013.01); *B23C 2210/03* (2013.01); *B23C 2240/24* (2013.01); *B23C 2250/12* (2013.01); *B23C 2270/06* (2013.01); *B23P 11/00* (2013.01); *Y10T 407/1932* (2015.01); *Y10T 408/95* (2015.01); *Y10T 409/30952* (2015.01)

(56) References Cited

U.S. PATENT DOCUMENTS

| | | | | |
|---|---|---|---|---|
| 4,292,866 | A | * | 10/1981 | Kaczynski ............. B23B 29/20 279/2.03 |
| 4,708,536 | A | * | 11/1987 | Sullivan ................ B23C 5/2243 407/41 |
| 4,924,051 | A | * | 5/1990 | Sebzda, Sr. ......... B23B 31/4013 219/69.15 |
| 5,496,137 | A | | 3/1996 | Ochayon et al. |
| 5,598,751 | A | | 2/1997 | Ochayon et al. |
| 6,599,050 | B1 | | 7/2003 | Sjöö |
| 2010/0247263 | A1 | | 9/2010 | Azegami et al. |
| 2010/0290845 | A1 | | 11/2010 | Shimoda et al. |

\* cited by examiner

EXCHANGEABLE HEAD CUTTING TOOL

CROSS-REFERENCE TO RELATED PATENT APPLICATIONS

This application is a U.S. National Phase application under 35 U.S.C. §371 of International Patent Application No. PCT/JP2012/071973, filed Aug. 30, 2012, and claims the benefit of Japanese Patent Application No. 2011-197074, filed on Sep. 9, 2011, all of which are incorporated by reference in their entirety herein. The International Application was published in Japanese on Mar. 14, 2013 as International Publication No. WO/2013/035619 under PCT Article 21(2).

FIELD OF THE INVENTION

The present invention relates to an exchangeable head cutting tool such as a cutting head which has a cutting portion and is connected to a holder, or a holder which is connected to and holds the cutting head.

BACKGROUND OF THE INVENTION

As such an exchangeable head cutting tool, in, for example, Japanese Patent Application Laid-Open (kokai) JP-A-7-164234, there is proposed a cutting tool made such that a male thread portion is formed at a rear end portion of a cutting head integrally formed of cemented carbide and connection is made by screwing the male thread portion into a female thread portion formed in a holder. Further, Japanese Patent Application Laid-Open (kokai) JP-A-2003-251540 proposes another exchangeable head cutting tool wherein, a steel section is firmly fixed on a shank section made of cemented carbide by brazing; and in order to hold a cutting head to the steel section, the steel section provides a female thread portion on the back side from a position where the cutting head is mounted.

However, like the exchangeable head cutting tool described in Patent Citation 1, in a cutting tool in which a male thread portion is directly formed at a cutting head made of cemented carbide which has a high hardness but is also a hard brittle material, chipping easily occurs in threads, and thus it is not possible to reliably connect it to a holder. Further, in a holder in which a shank section made of cemented carbide and a steel section with a female thread portion formed therein are firmly fixed to each other by brazing, like Patent Citation 2, it is difficult to secure the strength of a joined portion between the shank section and the steel section and there is a concern that the steel section may be come off from the shank section due to cutting resistance.

Therefore, in Japanese Patent Application No. 2010-72765 and Japanese Patent Application No. 2010-218643, the inventors of the present invention previously proposed an exchangeable head cutting tool wherein:
its tool main body, such as a cutting head and/or a holder, made of a hard material for example cemented carbide, provides a mounting hole having concave portions in its inner peripheral surface, as if the peripheral surface were corrugated with predetermined surface roughness. In the above exchangeable head cutting tool, to join the tool main body and the connecting member together, a cylindrical mounting portion of a connecting member made of a metal material having a lower hardness than the above hard material is inserted into the mounting hole; the mounting portion is plastically deformed such that the diameter thereof is expanded, by press-fitting and extracting a press-fitting member (a punch) having an outer diameter larger than the inner diameter of the mounting portion into and from an inner peripheral portion of the mounting portion; and the outer peripheral surface of the mounting portion is brought into close contact with the inner peripheral surface of the mounting hole, thereby being engaged with the concave portions.

Therefore, in such an exchangeable head cutting tool, by forming a screw portion for connection of the cutting head or the holder in the connection member made of the metal material in which while a hardness is low, toughness is high and thus it is difficult to be damaged, and it is possible to reliably connect the cutting head and the holder. Further, since the mounting portion is plastically deformed by the press-fitting member such that the diameter thereof is expanded, and thus the outer peripheral surface thereof is brought into close contact with the inner peripheral surface of the mounting hole and also engaged with the concave portions, the joint strength between the tool main body and the connecting member is high and thus there is also no concern that the tool main body and the connecting member may be separated from each other due to cutting resistance and thus the cutting head may fall off.

However, in such an exchangeable head cutting tool, if in order to further enhance the joint strength between the tool main body and the connecting member, the connecting member is formed of a metal material having a lower hardness than the tool main body but having a relatively high hardness or the amount of plastic deformation of the mounting portion is increased by making a difference between the outer diameter of the press-fitting member and the inner diameter of the mounting portion large, excessive load acts on the press-fitting member and thus wear is promoted or the metal material forming the connection member is welded to the press-fitting member, whereby there is a concern that the life of the press-fitting member may be shortened. For this reason, it is difficult to mass-produce an exchangeable head cutting tool in which the joint strength between the tool main body and the connecting member is further increased in this way.

The present invention has been made under such a background and has an object to provide an exchangeable head cutting tool in which mass production is possible without causing shortening of the life of a press-fitting member even while further improving the joint strength between a tool main body and a connecting member.

SUMMARY OF THE INVENTION

In order to solve the above problem and thus achieve such an object, according to the invention, there is provided an exchangeable head cutting tool in which a tool main body made of a hard material and a connecting member made of a metal material having a lower hardness than the hard material are joined to each other by inserting a cylindrical mounting portion of the connecting member into a mounting hole formed in the tool main body and having concave portions in an inner peripheral surface, and plastically deforming the mounting portion so as to expand a diameter thereof, thereby bringing an outer peripheral surface of the mounting portion into close contact with the inner peripheral surface of the mounting hole and thus making the outer peripheral surface of the mounting portion engage with the concave portions, wherein a diameter expanding member having a higher hardness than the connecting member is press-fitted into and fixed to an inner peripheral portion of the mounting portion and the mounting portion is plastically deformed by the diameter expanding member.

In such an exchangeable head cutting tool, the mounting portion is plastically deformed such that the diameter thereof is expanded, by press-fitting the diameter expanding member having a higher hardness than the connecting member into the inner peripheral portion of the mounting portion, rather than expanding the diameter by plastically deforming the mounting portion of the connecting member by press-fitting and extraction of the press-fitting (the punch), as described above, and the diameter expanding member is left in the inner peripheral portion as it is, thereby being fixed to the mounting portion, and for this reason, it is not necessary for the press-fitting member such as the punch for press-fitting the diameter expanding member to be brought into contact with the inner peripheral portion of the mounting portion.

Therefore, even if in order to further enhance the joint strength between the tool main body and the connecting member, the connecting member is formed of a metal material having a relatively high hardness or the amount of plastic deformation of the mounting portion is increased by making a difference between the outer diameter of the diameter expanding member and the inner diameter of the mounting portion large, it becomes possible to cope with mass production without causing damage or the like in the press-fitting member. Further, even without forming the connecting member of a metal material having a high hardness or increasing the amount of plastic deformation of the mounting portion in this manner, improvement in the joint strength between the tool main body and the connecting member can also be attained because the diameter expanding member having a higher hardness than the connecting member is press-fitted into and left in the inner peripheral portion of the mounting portion.

Here, in order to attain smooth press-fitting of the diameter expanding member, it is preferable that in the diameter expanding member, at least a portion of the diameter expanding member facing the side in the direction of press-fitting into the inner peripheral portion of the mounting portion be formed such that an outer diameter gradually reduces as it goes in the press-fitting direction. As such a diameter expanding member, for example, a diameter expanding member having a spherical shape or a diameter expanding member having a tapered pin shape is also acceptable, or a spherical diameter expanding member having a flat surface on the rear side in the press-fitting direction so as to be easily press-fitted by the leading end surface of the punch is also acceptable.

Further, in such an exchangeable head cutting tool, there is a case where the inner peripheral portion of the mounting portion of the connecting member is used as a coolant hole for supplying a coolant to a cutting portion of a cutting head. However, if the inner peripheral portion of the mounting portion is sealed by the press-fitting of the diameter expanding member, it is not possible to supply the coolant. Therefore, in such a case, a groove extending to cross a position where an outer diameter in a cross section orthogonal to a central axis of a cylinder that is formed by the mounting portion becomes the maximum in the diameter expanding member fixed to the inner peripheral portion of the mounting portion, in a direction of the central axis, is formed in the inner peripheral portion of the mounting portion, whereby it becomes possible to supply the coolant through the groove.

Advantageous Effects

As described above, according to the invention, even if in order to attain improvement in the joint strength between the tool main body and the connecting member, the connecting member is formed of a metal material having a high hardness or the amount of plastic deformation is increased, it is possible to perform mass production without causing the shortening of the life of the press-fitting member due to damage or the like, and also by the diameter expanding member being press-fitted into and left in the mounting portion of the connecting member, it becomes possible to attain improvement in the joint strength between the tool main body and the connecting member.

BRIEF DESCRIPTION OF DRAWINGS

These and other features and advantages of the present invention will become more readily appreciated when considered in connection with the following detailed description and appended drawings, wherein like designations denote like elements in the various views, and wherein.

EXPLANATION OF REFERENCES

1: head main body (tool main body)
1A: head main body material
2: connecting member
3: holder
4: diameter expanding member
11: cutting portion
12: engagement portion
13: tapered shaft portion
14: chip discharge groove
15a: peripheral cutting edge
15b: end cutting edge
15c: corner edge
16: mounting hole
16a: annular groove (concave portions)
17: coolant hole
18: branch hole
21: mounting portion
21a: groove
22: male thread portion
O: axis of a head main body (tool main body) 1 (central axis of a cylindrical mounting portion 21)
T: end mill rotation direction
P: punch (press-fitting member)
F: press-fitting direction

DETAILED DESCRIPTION OF THE INVENTION

Best Mode for Carrying Out the Invention

Figure 1:
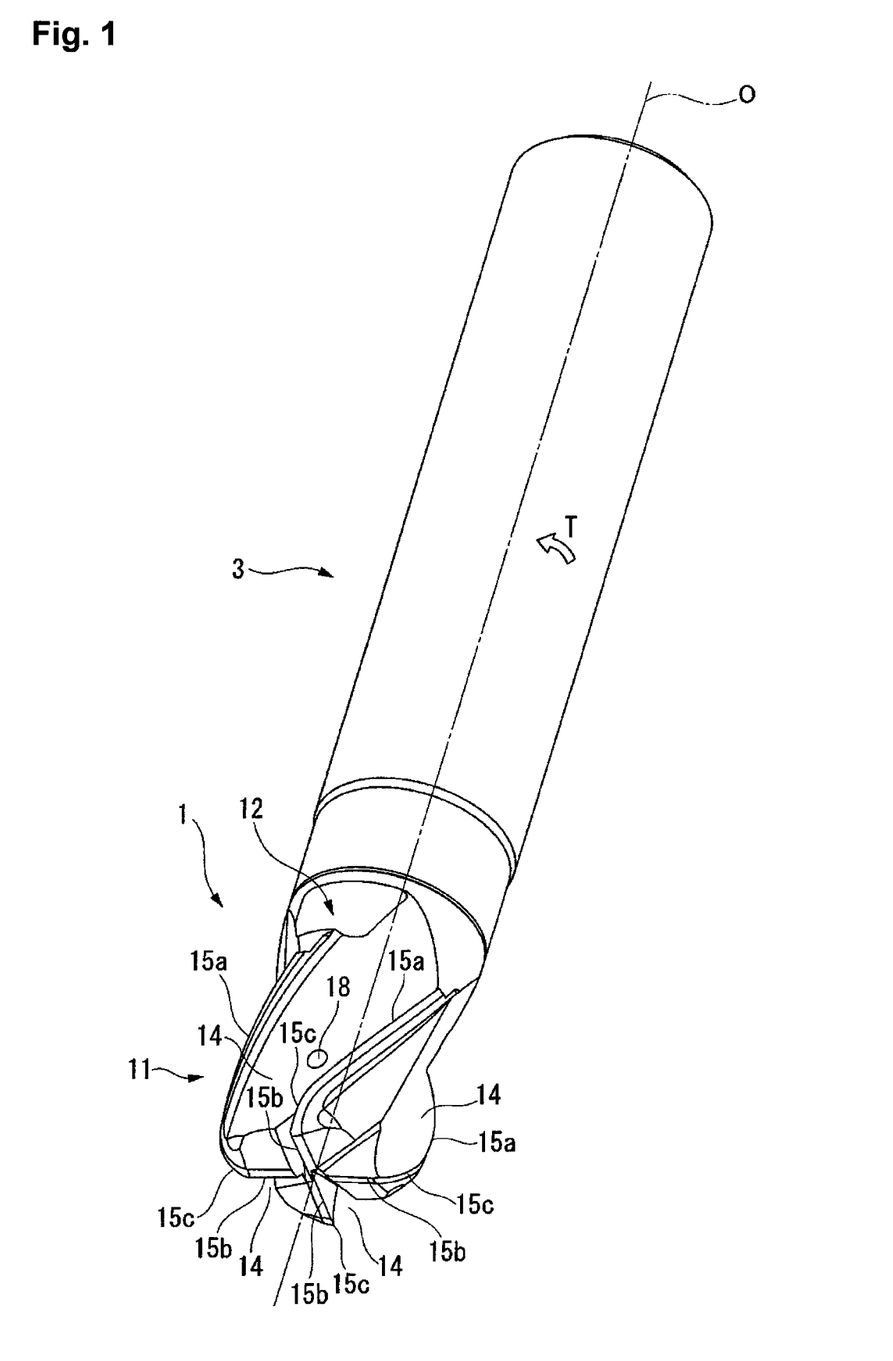
FIG. 1 is a perspective view showing a state where a cutting head that is an embodiment of an exchangeable head cutting tool according to the invention is mounted in a holder.
Figure 2:
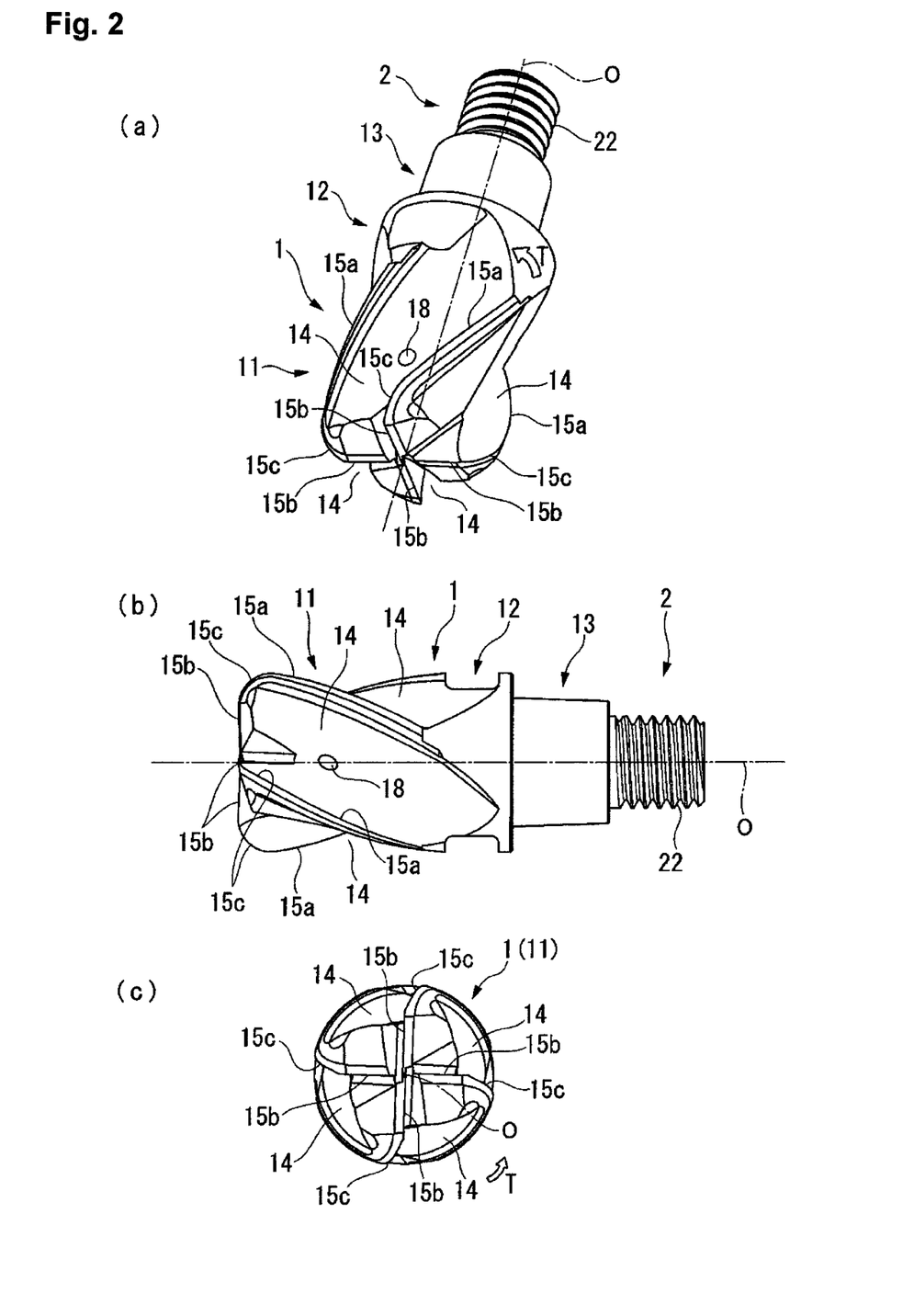
FIG. 2(a) is a perspective view of the cutting head of the embodiment shown in FIG. 1.
FIG. 2(b) is a side view of the cutting head.
FIG. 2(c) is a front view of the cutting head.
Figure 3:
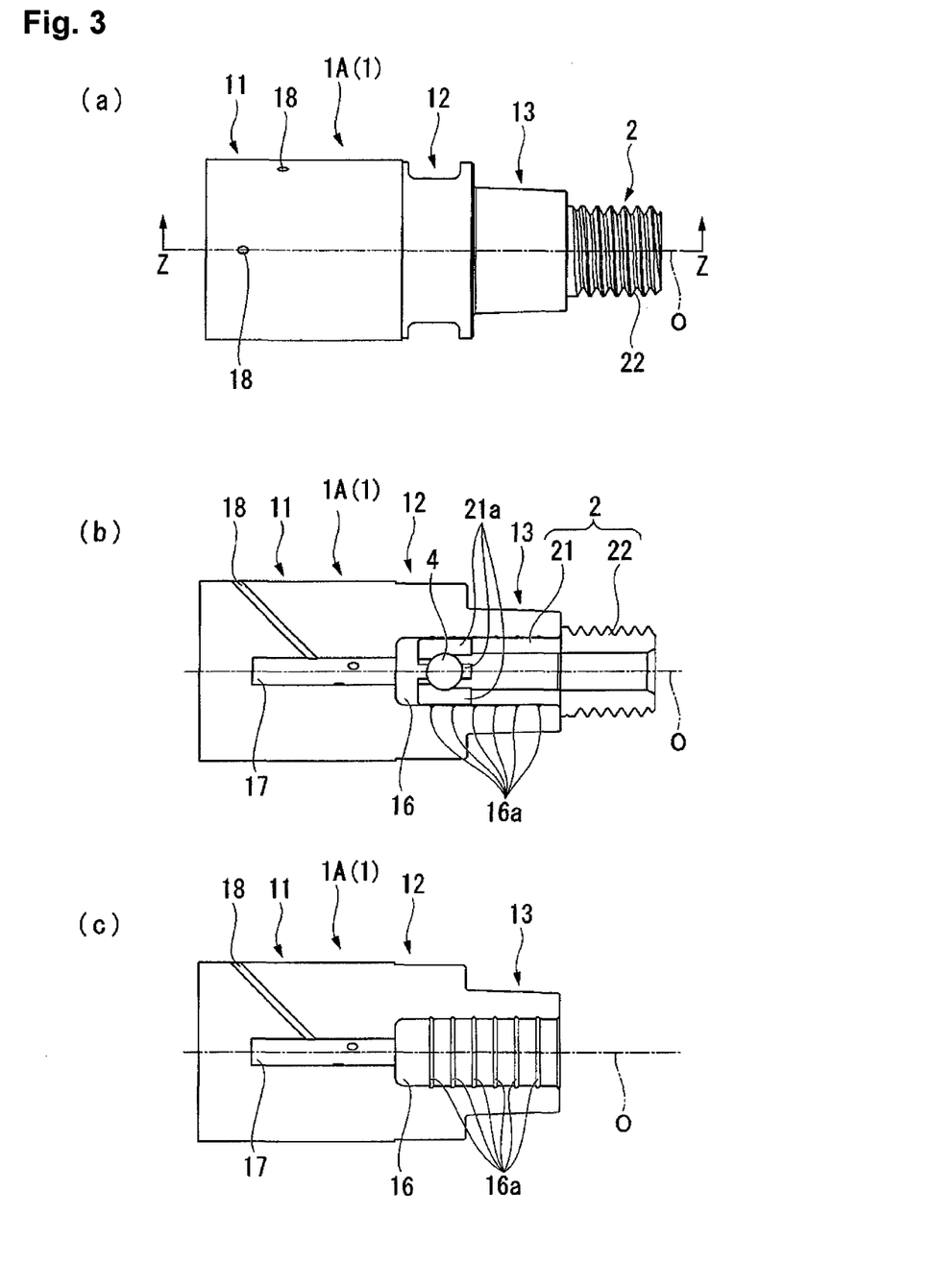
FIG. 3(a) is a side view of a cutting head material to be manufactured into the cutting head of the embodiment shown in FIG. 1.
FIG. 3(b) is a cross-sectional side view along line Z-Z in FIG. 3(a).
FIG. 3(c) is a cross-sectional side view of a tool main body material (head main body material) portion in FIG. 3(b).

FIGS. 1 to 5 show an embodiment in a case where the invention is applied to a cutting head which configures an end mill by being detachably mounted in a holder as an exchangeable head cutting tool. The cutting head is configured by joining a head main body 1 as a tool main body in this embodiment integrally formed of a hard material such as cemented carbide, cermet, or ceramics to a connecting member 2 made of a plastically deformable metal material such as a steel material such as stainless steel or die steel, in which a hardness is lower than that of the hard material forming the head main body 1, as shown in FIG. 2.

Such a cutting head configuring the end mill is connected to and mounted on a leading end portion of a holder 3 having a cylindrical shaft shape, as shown in FIG. 1, through the connecting member 2 such that a central axis O of the head main body 1 (in this embodiment, the central axis of a cylindrical mounting portion which will be described later) becomes coaxial, and performs cutting work on a workpiece by being fed in a direction crossing the axis O while the holder 3 is mounted on a spindle of a machine tool and rotated around the axis O in an end mill rotation direction T.

In the head main body 1, a cutting portion 11 in which cutting edges are formed, an engagement portion 12 with which a wrench or the like is engaged at the time of replacement of the cutting head, and a truncated conical tapered shaft portion 13 made such that an outer diameter thereof is still smaller than those of the cutting portion 11 and the engagement portion 12 and gradually reduces as it goes toward the rear end side and centered on the axis O are formed in order toward the rear end side (in FIG. 2(b), the right side) from the leading end side (in FIG. 2(b), the left side), as shown in FIG. 2. In addition, it is preferable that an inclination angle that the outer peripheral surface of the tapered shaft portion 13 makes with the axis O be in a range of 1° to 20°, more preferably, the inclination angle is in a range of 1° to 5°, further preferably, the inclination angle is in a range of 1° to 3°, and in this embodiment, the inclination angle is set to be 2°.

At the outer periphery of the cutting portion 11, a plurality of (in this embodiment, four) chip discharge grooves 14 twisted to the trailing side in the end mill rotation direction T around the axis O toward the rear end side of a leading end of the head main body 1 are at regular intervals in a circumferential direction, and a peripheral cutting edge 15a is formed as the cutting edge at a side ridge portion on the outer periphery side of each of the chip discharge grooves 14, and an end cutting edge 15b is likewise formed as the cutting edge at a side ridge portion on the leading end side. In addition, the end mill of this embodiment is a radius end mill, and at a corner portion where the peripheral cutting edge 15a and the end cutting edge 15b cross each other, a corner edge 15c having a convexly curved shape such as a ¼ arc is formed, and therefore, a plurality of (four) cutting edges, each of which is configured to have the peripheral cutting edge 15a, the end cutting edge 15b, and the corner edge 15c, are formed at the head main body 1.

FIG. 3(c) shows a head main body material 1A which is a material of the head main body 1 before the chip discharge grooves 14, the peripheral cutting edges 15a, the end cutting edges 15b, and the corner edges 15c are formed, and after the connecting member 2 is joined to the head main body material LA manufactured by sintering or the like of the hard material as described above, as shown in FIGS. 3(a) and 3(b), the chip discharge grooves 14, the peripheral cutting edges 15a, the end cutting edges 15b, and the corner edges 15c of the cutting portion 11 are formed, whereby the head main body 1 is manufactured.

In the head main body material 1A, as shown in FIG. 3(c), a mounting hole 16 which is opened at the rear end surface of the tapered shaft portion 13 and extends to the leading end side and a bottomed coolant hole 17 which communicates with the leading end side of the mounting hole 16 and has a still smaller diameter than the mounting hole 16 are formed along the axis O, and a plurality of branch holes 18 having a smaller diameter than the coolant hole 17 is formed from the inner peripheral surface of the coolant hole 17. In this embodiment, four branch holes 18, the number of which is the same number as the cutting edges, extend at intervals in the circumferential direction so as to be directed to the outer periphery side as it goes toward the leading end side, and are opened at the outer peripheral surface of a portion corresponding to the cutting portion 11 of the head main body 1 in the head main body material 1A.

In addition, the mounting hole 16 is made such that the bottom surface thereof, that is, a boundary portion between itself and the coolant hole 17 is substantially located at a boundary portion between the cutting portion 11 and the engagement portion 12 of the head main body 1 in the head main body material 1A in a direction of the axis O. Further, in the inner peripheral surface of the mounting hole 16, as concave portions in this embodiment, a plurality of (in this embodiment, six) annular grooves 16a in which a cross section along the axis O has a concavely curved shape such as an arc and which revolve around the axis O are formed at intervals from the rear end surface of the tapered shaft portion 13 and the bottom surface, as shown in FIG. 3(c). However, at least the annular groove 16a on the leading end side (in this embodiment, two annular grooves 16a on the leading end side) is formed at a position corresponding to the engagement portion 12 of the head main body 1 in the head main body material 1A in the direction of the axis O.

Figure 4:
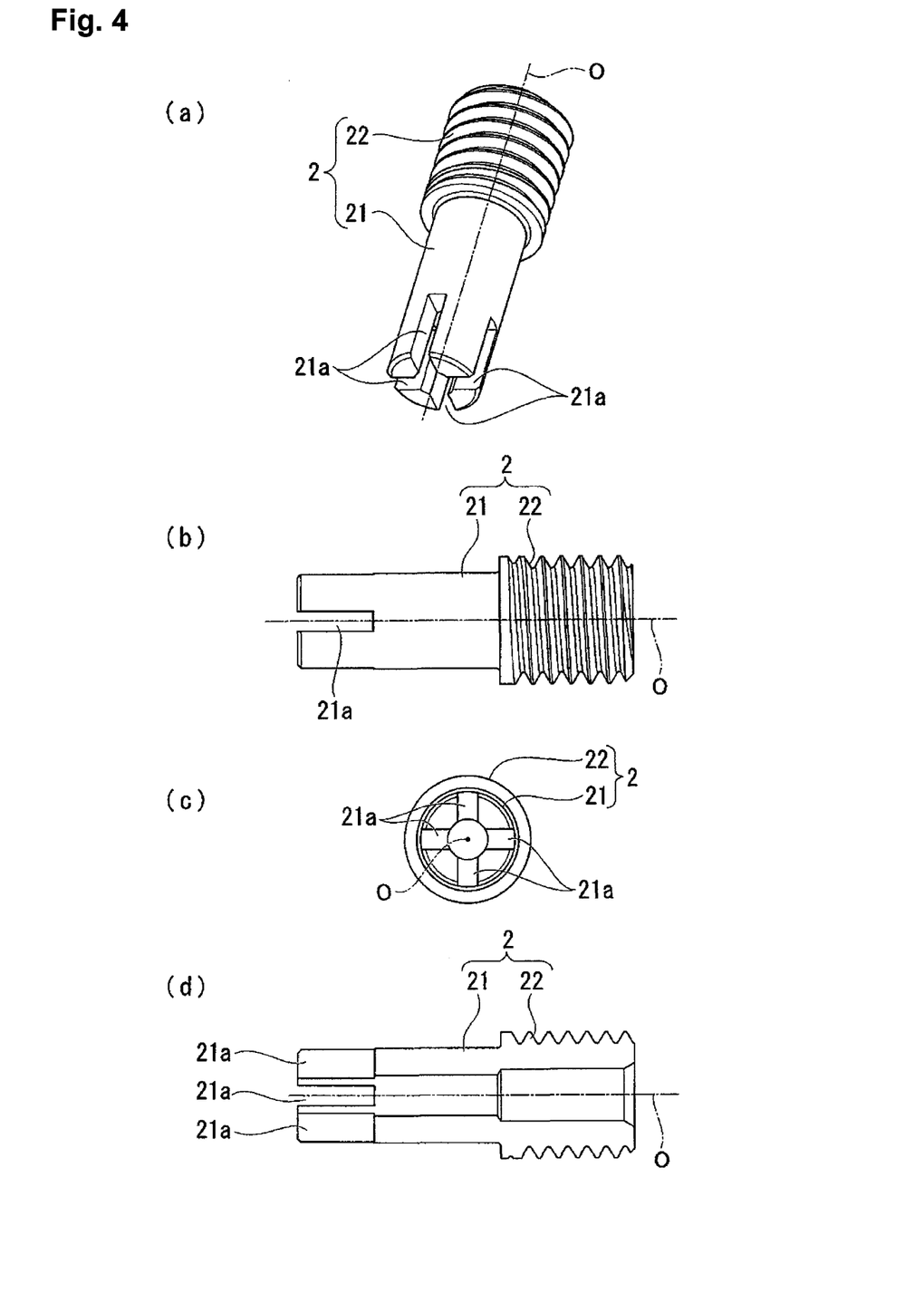
FIG. 4(a) is a perspective view of a connecting member before plastic deformation of the embodiment shown in FIG. 1.
FIG. 4(b) is a side view of the connecting member.
FIG. 4(c) is a front view of the connecting member.
FIG. 4(d) is a cross-sectional side view of the connecting member.

The connecting member 2 is a member in which a substantially cylindrical mounting portion 21 centered on the axis O is formed on the leading end side and a male thread portion 22 having a larger diameter than the mounting portion 21 is coaxially and integrally formed on the rear end side, as shown in FIG. 4, and the outer diameter of the mounting portion 21 is made slightly smaller than the inner diameter of the mounting hole 16 in the state before plastic deformation, and the outer diameter of the male thread portion 22 is made larger than the inner diameter of the mounting hole 16 and smaller than the outer diameter of the rear end surface of the tapered shaft portion 13. In addition, the direction of twist of the male thread portion 22 is a direction opposite to the end mill rotation direction T.

Further, an inner peripheral portion of the mounting portion 21 having a cylindrical shape also passes through the male thread portion 22 and is opened at the rear end surface of the connecting member 2, as shown in FIG. 4(d). However, an inner peripheral portion of the connecting member 2 is made such that the inner diameter is still slightly smaller at the portion of the mounting portion 21 than the portion of the male thread portion 22 in at least the state before plastic deformation shown in FIG. 4. Further, the length in the direction of the axis O of the mounting portion 21 is shorter than the depth of the mounting hole 16, as shown in FIG. 3(b). However, the length is made to be a length exceeding the forefront annular groove 16a in a state where the leading end surface of the male thread portion 22 is brought into contact with the rear end surface of the tapered shaft portion 13.

In addition, in this embodiment, a groove 21a extending in the direction of the axis O is formed in a leading end portion of the mounting portion 21. The groove 21a in this embodiment is a slit-like groove formed so as to be directed from a leading end of the mounting portion 21 to the rear end side along a plane which includes the axis O and to radially penetrate inner and outer peripheral portions of the mounting portion 21, and the groove 21a is formed in a plurality at intervals in the circumferential direction (in this embodiment, four at regular intervals in the circumferential direction). Further, the length of the groove 21a from the leading end of the mounting portion 21 is made such that a rear end of the groove 21a is substantially located at the boundary portion between the engagement portion 12 and the tapered shaft portion 13 of the head main body 1 in the head main body material 1A in the direction of the axis O in a state where the leading end surface of the male thread portion 22 is brought into contact with the rear end surface of the tapered shaft portion 13, as shown in FIG. 3(b).

Figure 5:
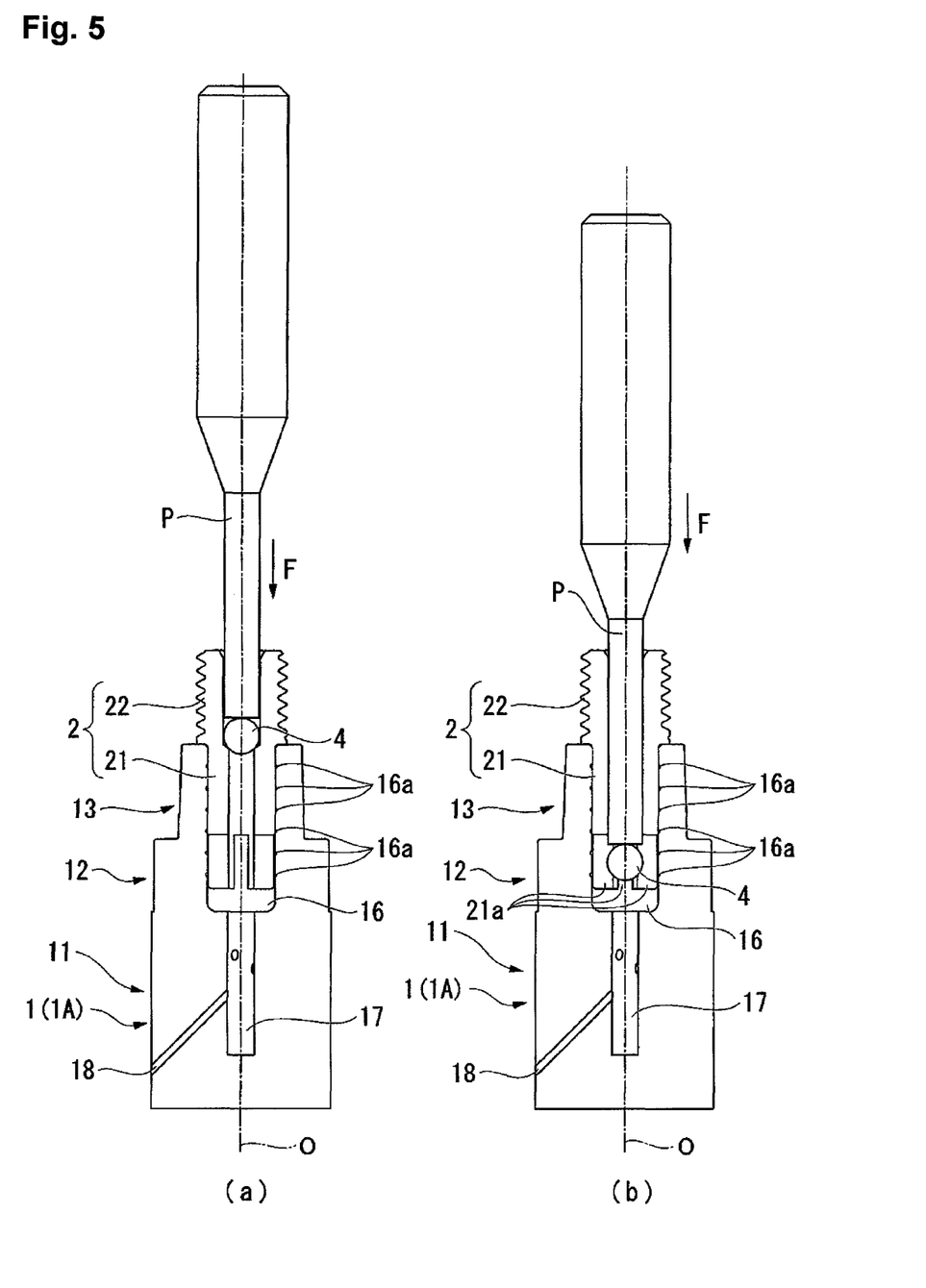
FIG. 5(a) is a cross-sectional side view before press-fitting of a diameter expanding member when joining the connecting member to the cutting head material shown in FIG. 3.
FIG. 5(b) is a cross-sectional side view after press-fitting of the diameter expanding member.

Then, in a state where the mounting portion 21 is inserted into the mounting hole 16 in the head main body material 1A and the leading end surface of the male thread portion 22 is brought into contact with the rear end surface of the tapered shaft portion 13, as described above, a diameter expanding member 4 is press-fitted into and fixed to the inner peripheral portion of the connecting member 2, as shown in FIG. 5, and thus the mounting portion 21 is plastically deformed such that the diameter thereof is expanded, whereby the connecting member 2 is joined to and mounted on the head main body material 1A, as shown in FIG. 3(b).

Here, in this embodiment, the diameter expanding member 4 has a hardness higher than that of the connecting member 2 and less than or equal to the hardness of the head main body 1. The diameter expanding member 4 is formed of, for example, a metal material such as tool steel or bearing steel and may be formed of a hard material such as cemented carbide, cermet, or ceramics, similar to the head main body 1. Further, the diameter expanding member 4 in this embodiment is of a spherical shape having a diameter larger than the inner diameter of the inner peripheral portion in the mounting portion 21 before plastic deformation of the connecting member 2 and smaller than the inner diameter of the inner peripheral portion in the male thread portion 22.

The diameter expanding member 4 is inserted from the rear end side into the inner peripheral portion of the connecting member 2 in a state where the leading end surface of the male thread portion 22 is brought into contact with the rear end surface of the tapered shaft portion 13, as shown in FIG. 5(a), press-fitted in a press-fitting direction F toward the leading end side in the direction of the axis O by a punch P having a leading end shaft portion having an outer diameter slightly smaller than the diameter of the diameter expanding member 4, thereby being press-fitted while plastically deforming the mounting portion 21 so as to push out the mounting portion 21 to the outer periphery side and thus expand the diameter thereof, and left in and fixed to the inner peripheral portion of the connecting member 2 in the mounting portion 21 without coming out of the mounting portion 21, as shown in FIG. 5(b).

Therefore, in this way, the mounting portion 21 is plastically deformed such that the diameter thereof is expanded, whereby the inner diameter of the inner peripheral portion of the mounting portion 21 becomes larger at the portion on the rear side in the press-fitting direction F (the rear end side in the direction of the axis O) across the diameter expanding member 4 than the portion on the press-fitting direction F side (the leading end side in the direction of the axis O) of the diameter expanding member 4, and thus the outer peripheral surface of the mounting portion 21 is strongly brought into close contact with and pressed to the inner peripheral surface of the mounting hole 16 and engaged with the inner peripheral surface of the mounting hole 16 in such a manner that a portion of the outer peripheral surface of the mounting portion 21 penetrates into the annular grooves 16a as the concave portions formed in the inner peripheral surface of the mounting hole 16 due to plastic deformation. In this way, the connecting member 2 is locked with respect to the head main body material 1A and the head main body 1 so as not to come out in the direction of the axis O and solidly integrated with the head main body material 1A and the head main body 1 with even the relative rotation around the axis O restricted by the close contact between the outer peripheral surface of the mounting portion 21 and the inner peripheral surface of the mounting hole 16.

In addition, in this embodiment, the diameter expanding member 4 is made such that in a state where the diameter expanding member 4 is fixed to the inner peripheral portion of the connecting member 2 in the mounting portion 21, as described above, the position where the outer diameter thereof in a cross section orthogonal to the axis O becomes the maximum is located, with respect to the head main body material 1A, at the engagement portion 12 in the head main body 1 in the direction of the axis O, as shown in FIG. 3(b), and located, with respect to the connecting member 2, at the portion where the grooves 21a of the leading end of the mounting portion 21 are formed. In addition, the groove 21a is made such that a leading end and a rear end in the direction of the axis O are located further to the leading end side and the rear end side in the direction of the axis O than the diameter expanding member 4 fixed in this way and are respectively opened to the inside of the mounting hole 16 and the inner peripheral portion of the mounting portion 21. That is, the groove 21a is formed so as to cross the position where the outer diameter in a cross section orthogonal to the axis O of the fixed diameter expanding member 4 becomes the maximum, in the direction of the axis O.

The head main body material 1A with the connecting member 2 mounted thereon in this way is manufactured into the head main body 1 by forming the chip discharge grooves 14 and the cutting edges which include the peripheral cutting edges 15a, the end cutting edges 15b, and the corner edges 15c therein, as described above. In addition, at this time, the branch holes 18 branched from the coolant hole 17 are respectively opened toward the cutting edges at the bottom surfaces of the chip discharge grooves 14, as shown in FIG. 2.

In addition, in the head main body 1 manufactured in this way, the male thread portion 22 of the connecting member 2 is screwed into a female thread portion (not shown) formed in an inner peripheral portion of the holder 3 having a cylindrical shaft shape, whereby the rear end surface of the engagement portion 12 is brought into contact with the leading end surface of the holder 3 and the outer peripheral surface of the tapered shaft portion 13 is brought into close contact with the inner peripheral surface of a tapered hole portion (not shown) which is formed between the female thread portion and the leading end surface of the holder 3 and in which the diameter thereof gradually increases as it goes toward the leading end side, and thus the head main body 1 is connected to the holder 3 and used for cutting work, as described above.

In the cutting head that is the exchangeable head cutting tool configured in this manner, in order to mount the connecting member 2 in the mounting hole 16 formed in the head main body material 1A of the head main body 1 that is a tool main body, the mounting portion 21 is plastically deformed by press-fitting the diameter expanding member 4 which is a separate body from the punch P into the inner peripheral portion of the mounting portion 21 by the punch P, rather than plastically deforming the mounting portion 21 so as to expand the diameter thereof, by press-fitting and extracting a punch having an outer diameter larger than the inner diameter of the inner peripheral portion of the mounting portion 21 of the connecting member 2 into and from the inner peripheral portion, and therefore, by making the outer diameter of the leading end shaft portion of the punch P smaller than the diameter of the diameter expanding member 4, it is possible to avoid contact of the punch P itself with the inner peripheral portion of the mounting portion 21.

Therefore, even if in order to enhance, for example, the joint strength between the head main body 1 and the connecting member 2, the connecting member 2 is formed of a material having a higher hardness than the above metal material among plastically deformable materials or formed of a material having a higher hardness among the above metal materials or the amount of plastic deformation of the mounting portion 21 is set to be larger, it is possible to prevent damage such as wear from occurring in the punch P due to contact of the punch P with the inner peripheral portion of the mounting portion 21 of the connecting member 2. For this reason, the life of the punch P can be extended and it becomes possible to continuously mass-produce the cutting head in which the joint strength between the head main body 1 and the connecting member 2 is high in this manner.

Further, in the cutting head (the exchangeable head cutting tool) having the above configuration, the diameter expanding member 4 press-fitted by the punch P is left in the inner peripheral portion of the mounting portion 21 of the connecting member 2 as it is. Then, since the diameter expanding member 4 is formed of a material having a higher hardness than the material configuring the connecting member 2 in order to plastically deform the mounting portion 21 of the connecting member 2 so as to expand the diameter thereof, the diameter expanding member 4 is left in the inner peripheral portion of the mounting portion 21, whereby in the cutting head, the joint strength between the head main body 1 and the connecting member 2 can be further improved, compared to a cutting head in which the mounting portion 21 is simply expanded in diameter, and even if excessive cutting load acts at the time of cutting work, it is possible to reliably prevent occurrence of the situation in which the head main body 1 comes off.

Furthermore, in this embodiment, the diameter expanding member 4 left in this way is made such that the position where the outer diameter in a cross section orthogonal to the axis O becomes the maximum is located at the engagement portion 12 of the head main body 1 in the direction of the axis O after the diameter expansion of the mounting portion 21 by plastic deformation. Then, since the engagement portion 12 is formed so as to have a still larger diameter than the tapered shaft portion 13 having a small diameter on the rear end side of the head main body 1 and thus has high rigidity, the mounting portion 21 plastically deformed can be solidly retained between the engagement portion 12 and the diameter expanding member 4 and it becomes possible to attain further improvement of the joint strength.

Further, in this embodiment, the diameter expanding member 4 has a spherical shape, and thus the portion of the diameter expanding member 4 facing the side in the direction of press-fitting F (the leading end side in the direction of the axis O) by the punch P is made such that the outer diameter gradually reduces as it goes in the press-fitting direction F. However, as such a diameter expanding member, it is also possible to press-fit, for example, a columnar diameter expanding member having a diameter smaller than that of the inner peripheral portion of the male thread portion 22 of the connecting member 2 before plastic deformation and larger than that of the inner peripheral portion of the mounting portion 21, with the pressing force of the punch P. However, in such a diameter expanding member, resistance at the time of press-fitting becomes too large, whereas in the diameter expanding member 4 as in this embodiment described above, smooth press-fitting is attained, and thus press-fitting resistance can be prevented from becoming too large, whereby it becomes possible to further reduce a burden on the punch P.

Figure 6:
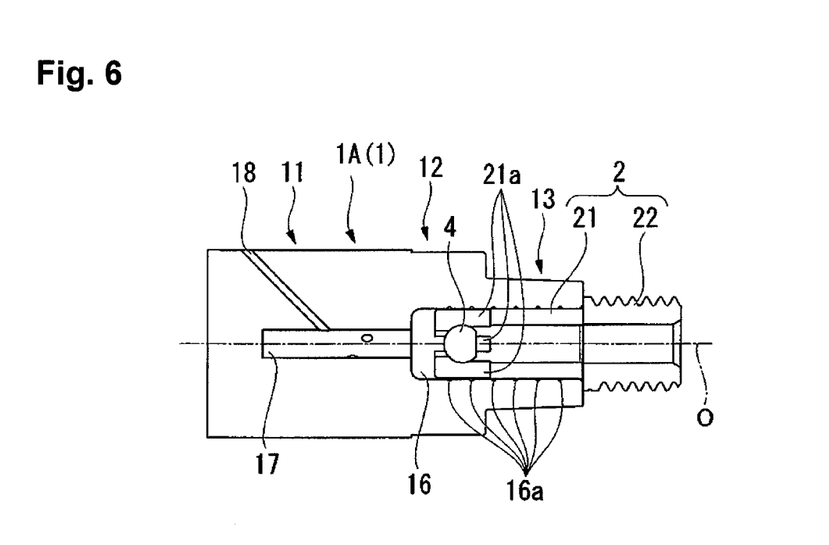
FIG. 6 is a cross-sectional side view showing a state where a modified example of the diameter expanding member is press-fitted, in the cutting head material shown in FIG. 3.

In addition, as the diameter expanding member 4, in addition to the spherical diameter expanding member as described above, for example, a diameter expanding member as in a modified example shown in FIG. 6 is also acceptable in which the portion facing the rear side in the press-fitting direction F (the rear side in the direction of the axis O) of the diameter expanding member 4 that is a spherical body is cut out by a flat surface perpendicular to the axis O. In a case where the diameter expanding member 4 has a complete spherical shape, if the leading end surface of the punch P is a flat surface, point contact with the diameter expanding member 4 is made, whereas, if a flat surface is formed on the rear side in the press-fitting direction F in this manner, surface contact is made, and thus it is possible to attain more stable press-fitting. In addition, such a flat surface may be formed by the rear side in the press-fitting direction F of the spherical diameter expanding member 4 being crushed by the punch P in the process of the press-fitting. Further, a truncated conical tapered pin in which the outer diameter thereof gradually reduces as it goes in the press-fitting direction F, as will be described later, is also acceptable, or a diameter expanding member having a shell shape is also acceptable.

Incidentally, in a cutting tool such as the exchangeable head end mill of the above embodiment, there is a case where cooling and lubrication of the cutting edges or a workpiece are attained by supplying a coolant such as cutting oil, compressed air, or mist from a main shaft of a machine tool with the holder 3 having a cylindrical shaft shape mounted thereon to the inner peripheral portion of the holder 3 and jetting the coolant from the inner peripheral portion of the connecting member 2 through the mounting hole 16, the coolant hole 17, and the branch holes 18 to the cutting edges. However, if the diameter expanding member 4 is left in the inner peripheral portion of the connecting member 2, thereby sealing the inner peripheral portion, as described above, it becomes not possible to perform supply of such a coolant.

Therefore, in a case of supplying the coolant through the inside of the head main body 1 (the tool main body) in this manner, it is favorable if the groove 21a extending to cross the position where the outer diameter in a cross section orthogonal to the axis O of the diameter expanding member 4 fixed to the inner peripheral portion of the mounting portion 21 of the connecting member 2 become the maximum, in the direction of the axis O, that is, the groove 21a in which the leading end and the rear end in the direction of the axis O are opened to and communicate with the inner peripheral portion of the mounting portion 21 further to the leading end side and the rear end side than the diameter expanding member 4 is formed in the inner peripheral portion of the mounting portion 21 and the coolant is supplied through the grooves 21a, as in this embodiment. In this case, the groove 21a may be a slit-like groove radially penetrating the inner and outer peripheries of the mounting portion 21, as in this embodiment, and may also be a groove formed so as to extend in the direction of the axis O in only the inner peripheral portion of the mounting portion 21 if it is not sealed by being crushed by the diameter expanding member 4 press-fitted.

Figure 7:
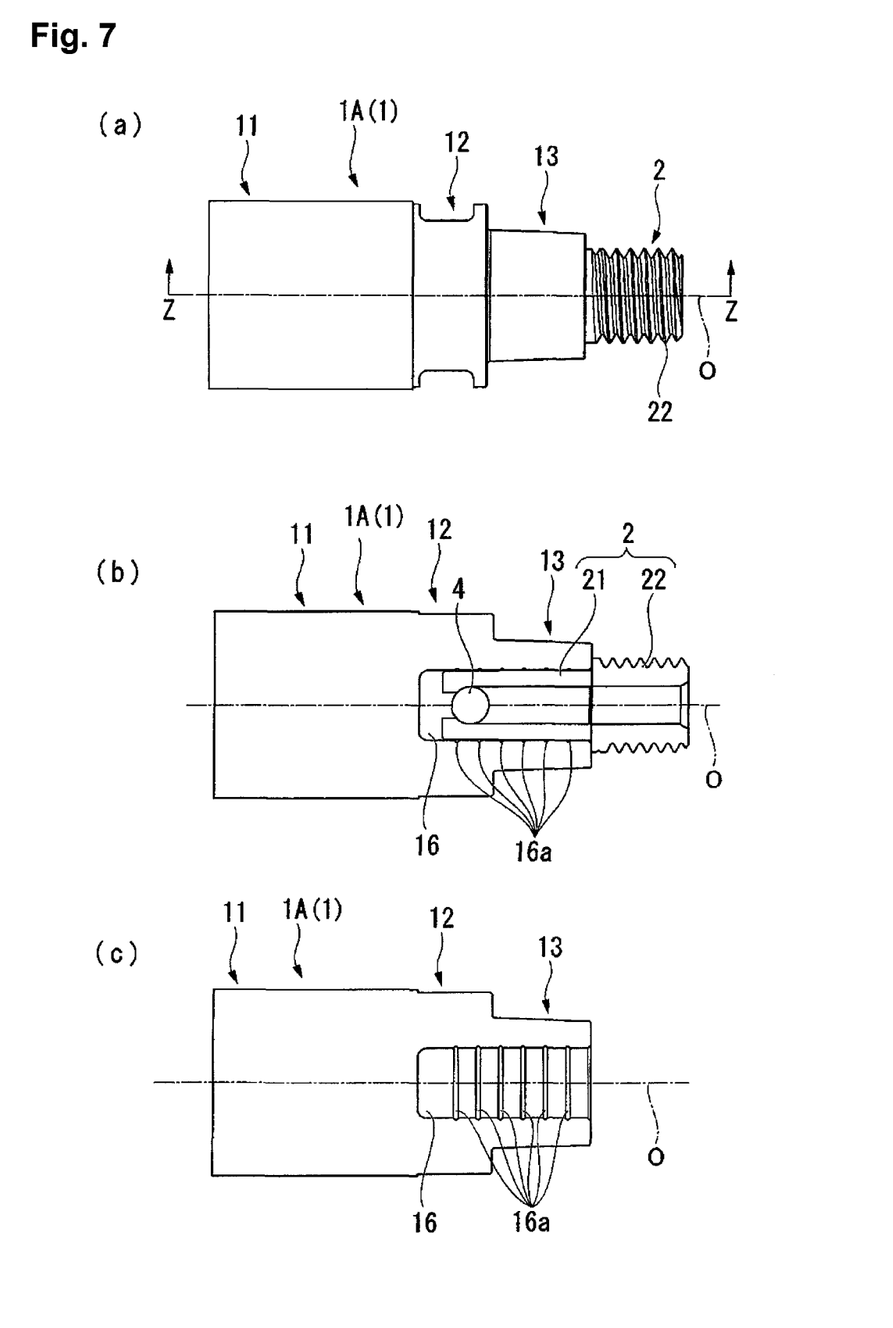
FIG. 7(a) is a side view of a modified example of the cutting head material shown in FIG. 3.
FIG. 7(b) is a cross-sectional side view along line Z-Z in FIG. 7(a).
FIG. 7(c) is a cross-sectional side view of a tool main body material (head main body material) portion in FIG. 7(b).
Figure 8:
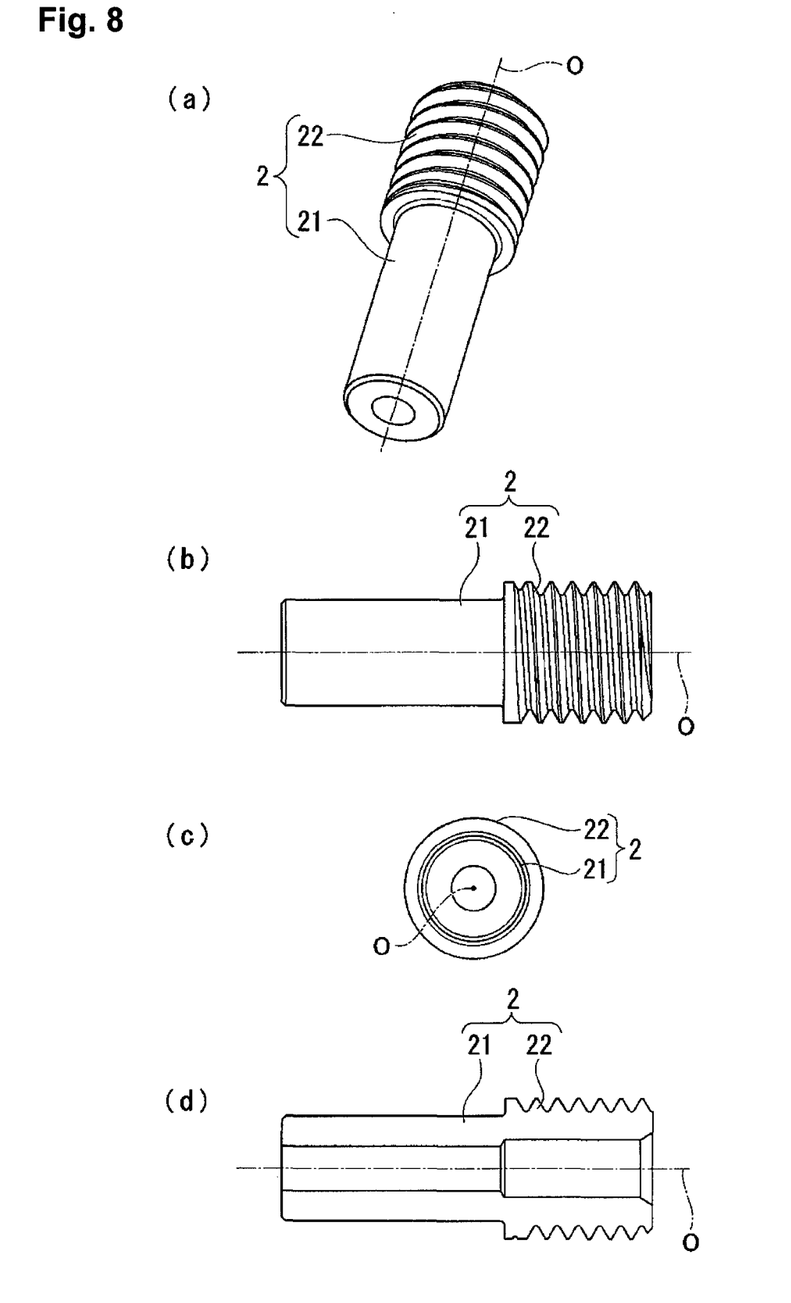
FIG. 8(a) is a perspective view of a connecting member before plastic deformation of the modified example shown in FIG. 7.
FIG. 8(b) is a side view of the connecting member.
FIG. 8(c) is a front view of the connecting member.
FIG. 8(d) is a cross-sectional side view of the connecting member.
Figure 9:
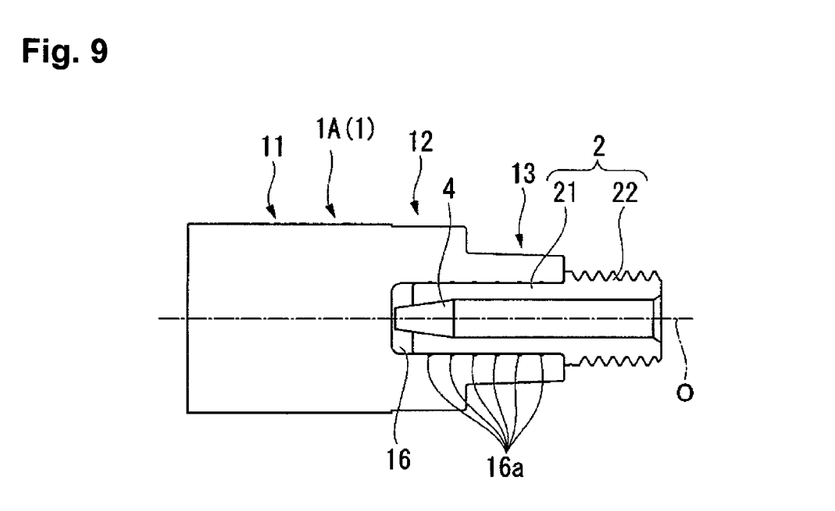
FIG. 9 is a cross-sectional side view showing a state where a modified example of the diameter expanding member is press-fitted, in the cutting head material shown in FIG. 7.

However, in a case where the coolant is not supplied through the inside of the head main body 1 in this manner, as in modified examples of the above embodiment shown in FIGS. 7 to 9, a configuration may be made such that the coolant hole 17 and the branch holes 18 are not formed in the head main body 1 (the head main body material 1A) and the grooves 21a are also not formed in the connecting member 2, as shown in FIG. 8. In this case, the mounting portion 21 of the connecting member 2 has a substantially complete cylindrical shape, as shown in FIG. 8.

Further, FIG. 9 is a modified example in which in a case where the coolant is not supplied through the inside in this manner, the diameter expanding member 4 is made to be the tapered pin as described above. Of course, the tapered pin shown in FIG. 9 may be used as the diameter expanding member 4 in the embodiments having the coolant hole 17 shown in FIGS. 1 to 6, and conversely, the spherical diameter expanding member 4 having a flat surface shown in FIG. 6 may be used as the diameter expanding member 4 in the embodiments having no coolant hole shown in FIGS. 7 to 9.

Incidentally, in the above embodiment and the modified examples thereof, the annular grooves 16a revolving around the axis O are formed as the concave portions of the inner peripheral portion of the mounting hole 16 of the head main body 1 (the head main body material 1A). However, in place of or in conjunction with the annular grooves 16a, a configuration may be made such that the inner peripheral surface of the mounting hole 16 is made to be a corrugated surface having surface roughness (however, reference length: 0.8 mm, cutoff value λs=0.0025 mm, λc=0.8 mm) in a range of 5 μm to 200 μm at the maximum height roughness Rz defined in, for example, JIS B 0601:2001 (ISO 4287: 1997) by using a sintered skin when the head main body material 1A is formed by sintering a powdery sintering material such as the above cemented carbide without performing polishing or the like on the inner peripheral surface of the mounting hole 16, as it is, and rotation around the axis O and movement in the direction of the axis O are restricted by making the plastically deformed outer peripheral surface of the mounting portion 21 of the connection member 2 penetrate into the corrugated surface.

Further, in place of or in conjunction with such a corrugated surface or the annular grooves 16a, a configuration may be made such that the inner diameter of the mounting hole 16 is formed so as to be very slightly larger at the engagement portion 12 of the head main body 1 which the diameter expanding member 4 is left in and fixed to in the direction of the axis O and the outer peripheral surface of the mounting portion 21 of the connection member 2 expanded in diameter due to plastic deformation is engaged with the portion, whereby the connecting member 2 is mounted. In addition, a groove extending in the direction of the axis O, a spiral groove, scattered dents, or the like may be formed in the inner peripheral surface of the mounting hole 16 and used as the concave portion.

On the other hand, in the above embodiment, a case of setting the head main body 1 of the exchangeable head cutting tool to be a tool main body and joining the connecting member 2 thereto has been described. However, it is also possible to apply the invention to a case where a holder main body of the holder 3 in which the head main body 1 is mounted is set to be a tool main body made of a hard material, the female thread portion which is provided in the holder 3 is formed in a connecting member, and the connecting member is joined to the holder main body. In this case, the inner diameter of an inner peripheral portion of a mounting portion of the connecting member which is inserted into a mounting hole formed in the holder main body is made smaller than the inner diameter of the female thread portion and a diameter expanding member is press-fitted into and fixed to the inner peripheral portion of the mounting portion, whereby the mounting portion is plastically deformed and thus the connecting member is joined to the holder main body.

The invention claimed is:
1. An exchangeable head cutting tool comprising:
 a tool main body made of a hard material and having a mounting hole with concave portions in an inner peripheral surface thereof;
 a connecting member made of a metal material having a lower hardness than the hard material and having a cylindrical mounting portion; and
 a diameter expanding member having a higher hardness than the connecting member, wherein
 the tool main body and the connecting member are joined by inserting the cylindrical mounting portion into the mounting hole, and by plastically deforming the mounting portion so as to expand a diameter thereof, thereby bringing an outer peripheral surface of the mounting portion into close contact with the inner peripheral surface of the mounting hole and thus making the outer peripheral surface of the mounting portion engage with the concave portions in such a manner that a portion of the outer peripheral surface of the mounting portion penetrates into the concave portions due to plastic deformation, the diameter expanding member is press-fitted into and fixed to an inner peripheral portion of the mounting portion, and the mounting portion is plastically deformed by the diameter expanding member.

2. The exchangeable head cutting tool according to claim 1, wherein in the diameter expanding member, at least a portion of the diameter expanding member facing the side in the direction of press-fitting into the inner peripheral portion of the mounting portion is provided such that an outer diameter gradually reduces as it goes in a press fitting direction.

3. The exchangeable head cutting tool according to claim 1, wherein a groove is provided in the mounting portion, said groove extending in a direction of a central axis of the mounting portion.

4. The exchangeable head cutting tool according to claim 2, wherein a groove is provided in the mounting portion, said groove extending in a direction of a central axis of the mounting portion.

5. The exchangeable head cutting tool according to claim 3, wherein the groove is extended in the direction of the central axis so as to cross a position where an outer diameter of the fixed diameter expanding member in a cross section orthogonal to the central axis becomes maximum.

6. The exchangeable head cutting tool according to claim 3, wherein the groove radially penetrates from an inner surface of the mounting portion toward an outer surface thereof.

7. The exchangeable head cutting tool according to claim 3, wherein the groove is formed in a plurality at intervals in a circumferential direction.

8. The exchangeable head cutting tool according to claim 1, wherein the connecting member has a thread portion provided at a rear side in a direction of press-fitting of the diameter expanding portion.

9. The exchangeable head cutting tool according to claim 8, wherein the diameter expanding member has a diameter larger than a diameter of an inner peripheral portion of the mounting portion before plastic deformation of the connecting member and smaller than a diameter of an inner peripheral portion of the thread portion.

10. The exchangeable head cutting tool according to claim 1, wherein the diameter expanding member is fixed to the inner peripheral portion of the mounting portion without being abutted by any other components except the inner peripheral portion of the mounting portion.

11. The exchangeable head cutting tool according to claim 3, wherein the groove radially penetrates from an outer surface on one side of the mounting portion through an outer surface on the other side of the mounting portion, which is provided at an opposite position across the central axis of the mounting portion from the one outer surface.

* * * * *